United States Patent Office 2,756,720
Patented July 31, 1956

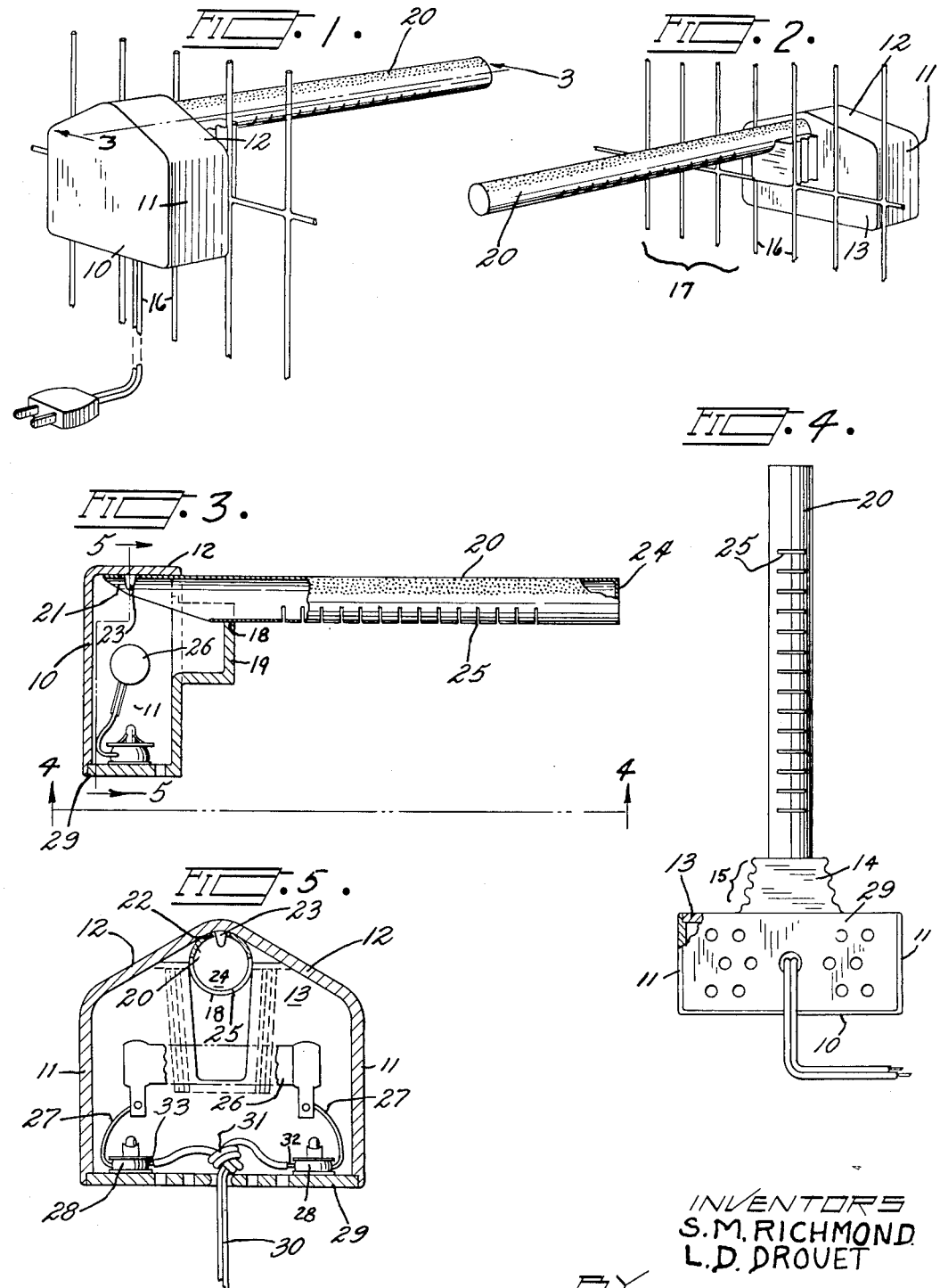

2,756,720

HEATED PERCH FOR BIRDS

Stanley M. Richmond and Louis D. Drouet, Eugene, Oreg.

Application April 30, 1954, Serial No. 426,842

5 Claims. (Cl. 119—26)

This invention relates generally to devices for use in the care of birds and particularly to a heated perch for birds.

The main object is to provide a perch with warming facilities whereby birds may be kept comfortably warm on their perches even though the air around the cage fluctuates through a greater range than is ordinarily regarded as desirable.

The second object is to so construct the device that the birds may select that portion of a perch which best satisfies its temperature needs.

The third object is to so produce the device that it may be readily made of plastic and aluminum.

The fourth object is to so construct the device that the heating unit may be mounted on the outside of the cage.

We accomplish these objects in the manner set forth in the following specification as illustrated in the accompanying drawing, in which Fig. 1 is perspective view of the warmer showing its position with relation to the cage, viewed from the outside of the cage.

Fig. 2 is similar to Fig. 1 but viewed from inside of the cage.

Fig. 3 is a partial vertical section taken along the line 3—3 in Fig. 1.

Fig. 4 is a bottom view taken along the line 4—4.

Fig. 5 is a an enlarged broken vertical section taken along the line 5—5 in Fig. 3.

Referring in detail to the drawing, there is shown a plastic casing composed of a front 10 which is integral with the end walls 11 and roof sections 12.

The back 13 has a tapering extension 14 formed thereon whose grooved sides 15 engage the bars 16 of the cage 17, only a portion of which is shown.

The back 13 has an outlet or saddle 18 formed in the wall 19 in which saddle lies a perch 20 formed of aluminum tubing whose pointed inner end 21 occupies the ridge of the roof portions 12.

The end 21 is provided with the perforation 22, which receives the tapering pin 23 which projects downwardly from the roof portions 12.

The end 24 of the tube 20 is closed and the bottom of the tube or perch is provided with transverse slots 25 which permit warm air to circulate out through the slots 25 and up around the birds.

Heat is provided by a smaller resistor 26 (for example, 10 watt, 2000 ohms) and this may be varied to meet the requirements.

The resistor 26 is supported by the leads 27 which are attached to the anchors 28 mounted on the perforated floor 29 through which extends the cord 30 provided with a safety knot 31 which rests on the top side of the floor 29 while its leads 32 and 33 are secured to the anchors 28.

It can be seen that heat generated by the resistor 26 will cause warm air to rise by convection into the upper peaked portion of the casing from which it can escape only through the hollow perch 20 by way of slots 25, thereby warming the perch and the bird's feet by conduction and warming the underside of the bird's body by convection. It will be apparent that as some of the warm air escapes from the first slots there will be less to reach the more remote slots and so both conduction and convection heating effects will be reduced and a lower temperature will be experienced toward the remote end 24 of the perch.

It can be seen from the foregoing that not only is a perch provided which will enable the bird to select its own temperature at the point of perching, but also that there is no danger of the perch or any portion of the device from becoming soiled.

We claim:

1. A bird warmer comprised of a tubular aluminum perch having transverse slots therein, a holder connected with said perch insertable between the bars of a cage, and a casing supported by said holder, said casing having an electric heat generating device therein, said perch having an open end mounted in and communicating with said casing in order that heat generated therein may flow outwardly and escape from said transverse slots.

2. A bird warmer comprised of a horizontal tubular metal perch, a holder connected with said perch for supporting said perch from the bars of a bird cage, a casing supported by said holder and lying on the outer side of the bird cage, said perch having an open end mounted in and communicating with said casing, and an electrical heat generator in said casing, said perch having air outlets therein and said casing having air inlets whereby air can enter said casing and escape through the outlets in said perch.

3. A bird warmer comprising a casing, a heating element in said casing, an apertured tubular perch having an open end mounted in said casing, and means on said casing for mounting said warmer on the bars of a bird cage with said casing on the outside of the cage and said perch projecting into the cage, said perch forming a warm air outlet from said casing and being heated by conduction from warm air therewithin, the apertures in said perch releasing said warm air to warm the body of a bird on the perch by convection.

4. A bird warmer device comprising a casing, means on said casing engageable with a bird cage for mounting said casing on the outside of a bird cage, a tubular perch having an open end in said casing and an opposite end extending from said casing to project into the cage on which the device is mounted, and a heating element in said casing arranged to create a flow of warm air into said open end of said perch, said perch being supported by said casing and said mounting means and having openings for the escape of said warm air.

5. A bird warmer device as defined in claim 4 in which a lower portion of said casing is provided with an air inlet opening and an upper portion of said casing is provided with an air outlet opening, and means for securing said open end of said perch in said outlet opening.

References Cited in the file of this patent

UNITED STATES PATENTS

| 938,234 | Herman | Oct. 26, 1909 |
| 1,621,424 | McGinnis | Mar. 15, 1927 |
| 1,841,723 | Folsom | Jan. 19, 1932 |
| 2,013,058 | Leindorf | Sept. 3, 1935 |
| 2,256,259 | Forsyth | Sept. 16, 1941 |

FOREIGN PATENTS

| 174,009 | Switzerland | Mar. 1, 1935 |